United States Patent
Coulon et al.

[11] 3,967,919
[45] July 6, 1976

[54] COMPOUND TURBINE ROTOR

[75] Inventors: André Coulon; René Perrin, both of Belfort, France

[73] Assignee: Societe Generale de Constructions Electriques et Mecaniques (ALSTHOM), Paris, Cedex, France

[22] Filed: Apr. 18, 1975

[21] Appl. No.: 569,435

[30] Foreign Application Priority Data
May 21, 1974 France.............................. 74.17627

[52] U.S. Cl......................... 416/198 A; 416/213 R
[51] Int. Cl.².......................................... F01D 5/06
[58] Field of Search............ 416/198 A, 213, 213 A, 416/198–201; 29/156.8 R, 183

[56] References Cited
UNITED STATES PATENTS

| | | |
|---|---|---|
| 3,745,628 | 7/1973 | Stahl .............................. 29/156.8 R |
| 3,869,777 | 3/1975 | Coulon ................................. 29/183 |
| 3,876,335 | 4/1975 | Forcinal et al........................ 416/198 |

FOREIGN PATENTS OR APPLICATIONS

580,036   8/1946   United Kingdom..................... 416/1

*Primary Examiner*—Everette A. Powell, Jr.
*Attorney, Agent, or Firm*—Sughrue, Rothwell, Mion, Zinn & Macpeak

[57] ABSTRACT

The invention concerns welded turbine rotors. It is characterized in that, in the elements constituting a welded rotor which consist of a blade bearing block having at least one axial protuberance, that axial protuberance is made of steel having a lower carbon and nickel content than the remainder of the element and is joined thereto by a transition zone also made of steel. The invention applies more particularly to high-power steam turbines.

4 Claims, 3 Drawing Figures

COMPOUND TURBINE ROTOR

BACKGROUND OF THE INVENTION

1. Field of the Invention

The invention concerns turbine rotors, more particularly for steam turbines, which, due to their dimensions, do not consist of a single forging, but of several elements having a smaller size joined together by welding.

2. Description of the Prior Art

Another type of compound rotor, in which a shaft extending along the whole length of the rotor has rings shrunk on that shaft, is known. That structure causes extra stresses in the material constituting the elements of the rotor, but makes it possible to use steels having very high mechanical characteristics which, being difficult to weld, must not be used in presently known rotors having welded elements.

The present invention is intended to enable the use of steels having high mechanical strength in compound rotors of the welded type.

SUMMARY OF THE INVENTION

For that purpose, the invention provides a turbine rotor constituted by an axial succession of elements welded to one another and each comprising a blade bearing block, provided with at least one axial protuberance, in the form of a body having a substantially circular cross-section, on which is welded a similar axial protuberance of an adjacent element, characterized in that the said axial protuberance is made of a steel different from that constituting the said block and joined to that block by a transition zone also made of steel.

The steel constituting the protuberance can more particularly have a carbon content and, in the case of steels slightly alloyed with nickel, a nickel content lower than those of the steel constituting the said block, this imparting qualities of weldability thereto. The steel of the axial protuberance can be obtained by a processing method (melting in a vacuum, slag melting by electroconduction) giving very pure steel from the point of view of residual elements and gas contents, these purity qualities making for better weldability more particularly in the case of an electron beam weld.

More particularly, steel containing a maximum of 0.23% of carbon and 1.5% of nickel can be used for example for the protuberance and steel having a higher carbon content (content greater than 0.26%) and a nickel content of 3.5% can be used for the said block.

The steel constituting the transition zone is preferably a steel having a nickel content comprised between that of the steel for the protuberance and that of the steel for the said block. That transition zone can, more particularly, be obtained by casting from a consumable electrode. It can be formed between two forged ingots which after they have been joined together, are reforged and subjected to heat treatment.

With reference to the accompanying diagrammatic figures, an example of a welded compound rotor according to the invention and of the method for obtaining components of that rotor will be described, that example having no limiting character.

DESCRIPTION OF THE PREFERRED EMBODIMENT

Figure 1:
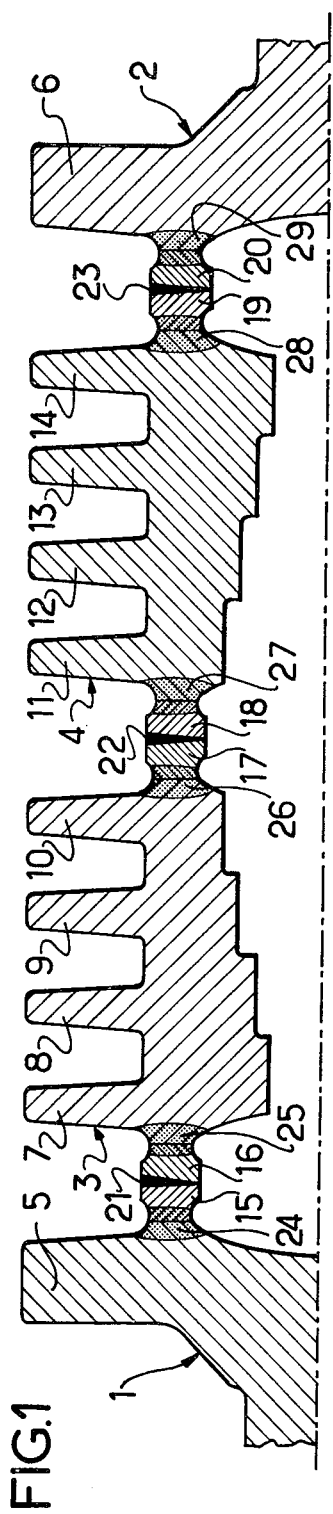
FIG. 1 is a longitudinal cross-section view of a steam turbine rotor.

The rotor in FIG. 1 is formed by four elements: two shaft ends 1 and 2 and two rings 3 and 4 welded together and to these shaft ends. These elements each comprise a blade bearing block constituted, for the shaft ends 1, 2, by a blade bearing disk 5, 6; for the rings 3, 4, by four blade bearing disks 7, 8, 9, 10, 11, 12, 13, 14.

The blade bearing blocks are provided with axial protuberances 15, 16, 17, 18, which are substantially annular. The axial protuberance 15, integral with the blade bearing disk 5, is welded at 21 to the axial protuberance 16 integral with the block of disks 7, 8, 9, 10; the axial protuberance 17 integral with the block of discs 7, 8, 9, 10, is welded at 22 to the axial protuberance 18 integral with the block of disks 11, 12, 13, 14. The axial protuberance 19 integral with the block of disks 11, 12, 13, 14 is welded at 23 to the axial protuberance 20 integral with the blade bearing disk 6.

Figure 2:
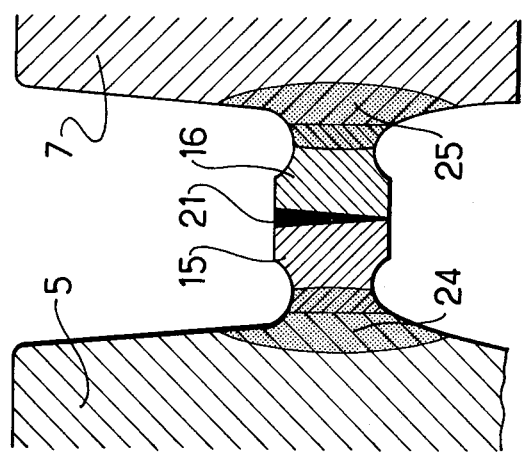
FIG. 2 is, on a larger scale, a portion of that cross-section in the region of the weld between two elements of the rotor.

The blocks constituting the fundamental part of the elements 1, 3, 4, 2 are, for example, made of steel slightly alloyed with nickel, containing 0.3% of carbon and 3.5% of nickel. The protuberances 15, 16, 17, 18, 19, 20 are, for example, made of steel containing 0.2% of carbon and 1.5% of nickel and are joined to the blocks to which they belong by the transition zones 24, 25, 26, 27, 28, 29, made of steel containing 2.5% of nickel. FIG. 2 shows, on a larger scale, the connection between the shaft end 1 and the ring 3. Thus, the zones of the rotor which are subjected to the greatest stresses, more particularly the zones situated under the blade bearing disks, are made of high resistance steel. The connection zones for joining the components of the rotor together, whose configuration is provided for, by means of rounded parts and of grooves, keeping these connection zones out of the influence of the blade bearing disks, are made of medium resistance steel which has good welding characteristics.

Figure 3:
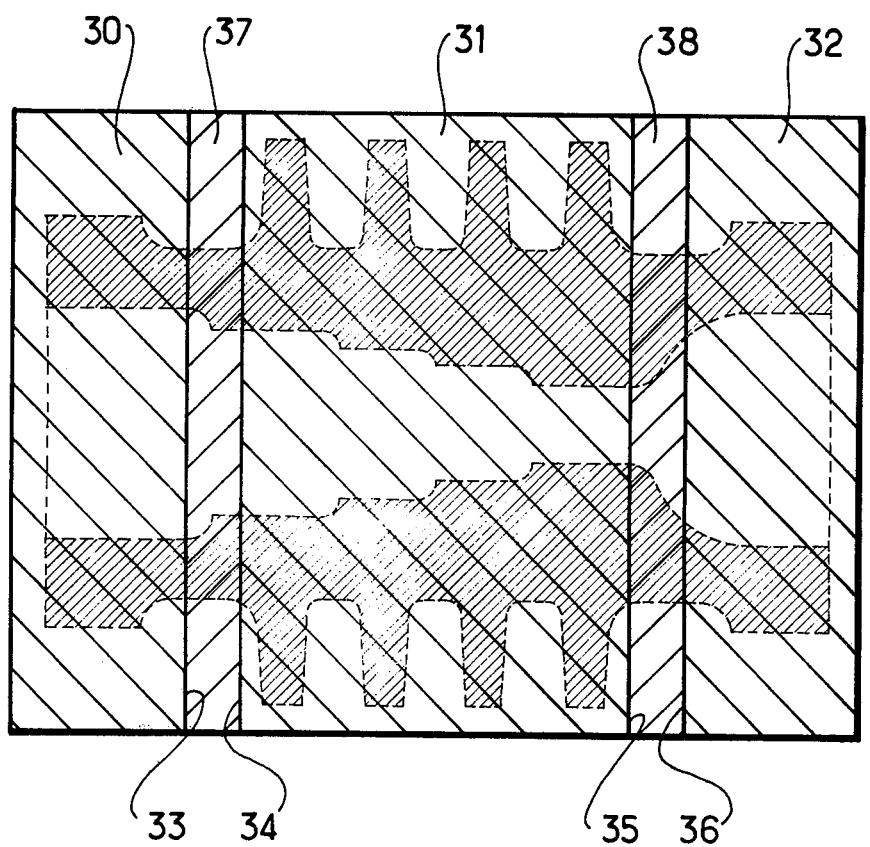
FIG. 3 is the cross-section of an ingot in which one of the components of the rotor is subsequently machined.

To obtain an element such as the ring 4, the following method can be used. As shown in FIG. 3, the process starts from three forged ingots or blooms 30, 31, 32 in the form of cylinders with a forging reduction coefficient in the order of 2, made, for example, respectively of a steel containing 0.2% of carbon and 1.5% of nickel, a steel containing about 0.3% of carbon and 3.5% of nickel and a steel containing 0.2% of carbon and 1.5% of nickel, whose ends are cut, these ends being machined to obtain plane surfaces facing each other: 33 and 34 – 35 and 36. The blooms 30, 31, 32 have the same diameter.

The faces 33 and 34 are joined together by a welding method called electroconduction, consisting in filling the space 37 between the faces 33 and 34, which are about a hundred millimeters apart, by slag melting with consumable electrodes in the form of plates. Likewise, the faces 35 and 36 are joined together by slag melting using consumable electrodes in the form of plates filling the space 38. These cylinders 37 and 38 thus obtained are made of steel containing 2.5% of nickel, for example.

After the joining together of the ingots 30, 31, 32, the assembly thus obtained is reforged with a forging reduction coefficient in the order of 2.2 to 2.5 to approach, in a more accurate manner, the dimensions of the finished rough forged part (shown in close-set shaded lines). The reforging of the weld preceding the final drawing of the rotor is a particularly useful operation for refining the grain of the steels used together, more particularly in the zone of metal affected by the heat during welding. Then, the rotor thus obtained is roughed and machined to draft dimensions and lastly is subjected to heat treatment which will be an intermediate treatment between that recommended for the steel of the ingot 31 and that recommended for the steel of the ingots 30 and 32.

Of course, the elements 1 and 2 are constituted by the joining together of two ingots instead of three ingots like elements 3 and 4.

Once it is finished, each element of the rotor is thus constituted, to a great extent, by a basic steel having great mechanical strength and, for the axial protuberances, by a weldable steel having medium mechanical characteristics, the transistion zones penetrating simultaneously into the basic steel having high mechanical strength and into the steel of the axial protuberances, in zones affected by the heat.

We claim:

1. In a turbine rotor constituted by an axial succession of elements welded to one another and each comprising a blade bearing block, provided with at least one axial protuberance, in the form of a body having a substantially circular cross-section, to which is welded a similar axial protuberance of an adjacent element, the improvement wherein: said axial protuberance is made of a steel different from that constituting said block and is joined to that block by a transition zone also made of steel.

2. The turbine rotor according to claim 1, wherein: the steel constituting said protuberance has a carbon content and, a nickel content, lower than those of the steel constituting said block.

3. The turbine rotor according to claim 2, wherein: the steel constituting said transition zone is preferably a steel having a nickel content comprised between that of the steel constituting said axial protuberance and that of the steel constituting said block.

4. The turbine rotor according to claim 2, wherein: the steel constituting said axial protuberance has a carbon content no greater than 0.25% and, a nickel content no greater than 1.5%, whereas the steel constituting said block has a carbon content higher than 0.26% and a nickel content lower than 3.5%.

* * * * *